(12) United States Patent
Shiono (10) Patent No.: US 9,259,972 B2
(45) Date of Patent: Feb. 16, 2016

(54) TIRE

(75) Inventor: Akiko Shiono, Ome (JP)

(73) Assignee: BRIDGESTONE CORPORATION, Tokyo (JP)

( * ) Notice: Subject to any disclaimer, the term of this patent is extended or adjusted under 35 U.S.C. 154(b) by 914 days.

(21) Appl. No.: 13/505,948

(22) PCT Filed: Oct. 28, 2010

(86) PCT No.: PCT/JP2010/069195
§ 371 (c)(1),
(2), (4) Date: May 3, 2012

(87) PCT Pub. No.: WO2011/055681
PCT Pub. Date: May 12, 2011

(65) Prior Publication Data
US 2012/0216931 A1 Aug. 30, 2012

(30) Foreign Application Priority Data
Nov. 5, 2009 (JP) ................................. 2009-253890

(51) Int. Cl.
*B60C 11/11* (2006.01)
*B60C 11/12* (2006.01)
*B60C 11/03* (2006.01)

(52) U.S. Cl.
CPC ............. *B60C 11/0306* (2013.04); *B60C 11/11* (2013.01); *B60C 11/12* (2013.01); *B60C 2011/0348* (2013.04); *B60C 2011/1209* (2013.04); *B60C 2200/06* (2013.04)

(58) Field of Classification Search
CPC .... B60C 11/0306; B60C 11/11; B60C 11/12; B60C 11/1236; B60C 2011/1209; B60C 2200/06; B60C 2011/0346; B60C 2011/0353; B60C 2011/0388
USPC ............ 152/209.1, 209.16, 209.18, 900, 902; D12/507, 510–513, 521, 516, 536, 539, D12/542–545, 548, 553, 571, 574, 577–580, D12/583, 588
See application file for complete search history.

(56) References Cited

U.S. PATENT DOCUMENTS

| | | | | |
|---|---|---|---|---|
| 4,807,679 A | * | 2/1989 | Collette et al. | 152/209.18 |
| 2008/0196808 A1 | * | 8/2008 | Ikeda | B60C 11/0306 |
| | | | | 152/209.24 |
| 2010/0180997 A1 | * | 7/2010 | Shimizu | 152/209.18 |

FOREIGN PATENT DOCUMENTS

| | | | |
|---|---|---|---|
| EP | 0295195 A1 | | 12/1988 |
| GB | 520231 | * | 4/1940 |

(Continued)

OTHER PUBLICATIONS

European Search Report dated May 16, 2013 issued in corresponding European Patent Application No. 10828241.9.

*Primary Examiner* — Eric Hug
(74) *Attorney, Agent, or Firm* — Sughrue Mion, PLLC (57) ABSTRACT

Wet performance and partial wear resistance of a tire are improved, and a noise generated during running of the tire is reduced.
At a tread portion 2, a plurality of land portions 20, 30, and 40 is defined by circumferential main grooves 10 and 11 extending in a zig-zag manner in a tire circumferential direction. In the center land portion 20 and the second land portion 30, a plurality of hexagonal blocks 21B, 22B, 23B, and 30B is provided, each gradually expanding to the both sides in the tire width direction from the both end portions in the tire circumferential direction toward the center. In the center land portion 20, the plurality of hexagonal blocks 21B, 22B, and 23B is arranged so as to be brought close to each other in the tire width direction while sandwiching a circumferential thin groove 24 extending in a zig-zag manner in the tire circumferential direction and to be defined by lug grooves 25, 26, and 27 in the tire circumferential direction. In the second land portion 30, the plurality of hexagonal blocks 30B is arranged so as to continue in the tire circumferential direction while sandwiching a sipe 31, and formed in a rib shape continuous in a ground-contacting surface.

7 Claims, 2 Drawing Sheets

(56) References Cited

FOREIGN PATENT DOCUMENTS

| | | | |
|---|---|---|---|
| JP | 02-014905 A | 1/1990 | |
| JP | 03-139404 A | 6/1991 | |
| JP | 2007-145209 A | 6/2007 | |
| JP | 2009-190558 A | 8/2009 | |
| JP | 2009-234362 A | 10/2009 | |
| WO | WO 2008/146851 | * 12/2008 | |

* cited by examiner

TIRE

CROSS REFERENCE TO RELATED APPLICATIONS

This application is a National Stage of International Application No. PCT/JP2010/069195 filed Oct. 28, 2010, claiming priority based on Japanese Patent Application No. 2009-253890, filed Nov. 5, 2009, the contents of all of which are incorporated herein by reference in their entirety.

TECHNICAL FIELD

The present invention relates to a tire having, at a tread portion, a plurality of land portions defined by a plurality of circumferential main grooves extending in a zig-zag manner in a tire circumferential direction.

BACKGROUND ART

In a tire for a heavy load such as a truck and a bus, a plurality of blocks is defined by circumferential main grooves extending in the tire circumferential direction and lug grooves, and the blocks are arranged on the whole of a tread portion so as to ensure required tire performances. However, with a tread pattern composed of the blocks, with running, a difference is caused in a wear amount between both end portions in the tire circumferential direction of the block, and heel-and-toe wear might occur in each block. This heel-and-toe wear is partial wear caused by a motion and deformation of the block during tire load rolling, in which a wear amount at a step-in end (portion contacting the ground first) of the block is smaller, while a wear amount at a kick-out end (portion contacting the ground last) is larger.

In order to cope with this problem, there is known a prior-art tire in which a block is formed into a hexagonal shape in planar view to reduce unevenness in slip in the tire circumferential direction and the tire width direction of each part in the block and a difference in the wear amount, thereby suppressing occurrence of the heel-and-toe wear (See Patent Document 1).

However, with this prior-art tire, the plurality of blocks is arranged independently in the tire width direction relatively uniformly, and there is a concern that a motion may easily occur in the block depending on the condition of use or running of the tire. Thus, securing of sufficient block rigidity and further improvement of an effect of suppressing partial wear are in demand from the viewpoint of further improvement of partial wear resistance through suppression of the motion of the block.

Moreover, in the tire having the blocks as above, the block is generally defined by arranging the lug grooves all having a certain angle and a certain width so that wet performances (traction performance and braking performance on a wet road surface, for example) are improved while an edge component is increased by the plurality of lug grooves. However, in this case, since the block rigidity tends to be lower, the partial wear resistance might be affected, and further improvement of both the wet performances and the partial wear resistance is difficult. With the prior-art tires, reduction of a noise generated during tire running is also in demand in addition to these performances.

CITATION LIST

Patent Document

[Patent Document 1] Japanese Unexamined Patent Application Publication No. 2007-145209

DISCLOSURE OF THE INVENTION

Problems to be Solved by the Invention

The present invention was made in view of the above prior-art problems and has an object to improve both the wet performances and the partial wear resistance of a tire including a plurality of land portions at a tread portion. Another object is to reduce a noise generated during running of the tire.

Means for Solving the Problems

The present invention is a tire comprising, at a tread portion, a plurality of circumferential main grooves extending in a tire circumferential direction in a zig-zag manner and a plurality of land portions defined by the circumferential main grooves, wherein the plurality of land portions includes a center land portion at the center part in a tire width direction in which a plurality of blocks gradually expanding to the both sides in the tire width direction from the both end portions in the tire circumferential direction toward the center and a second land portion on the both sides in the tire width direction of the center land portion, the center land portion has a plurality of the blocks arranged in plural closely to each other in the tire width direction and defined by lug grooves in the tire circumferential direction, and the second land portion is formed into a rib shape continuing in the tire circumferential direction while the plurality of blocks sandwiches a sipe.

Advantages of the Invention

According to the present invention, both the wet performances and the partial wear resistance of the tire including the plurality of land portions at the tread portion can be improved. Also, a noise generated during running of the tire can be reduced.

DESCRIPTION OF THE REFERENCE SYMBOLS 1 tire
2 tread portion
10 center-side circumferential main groove
11 outer-side circumferential main groove
20 center land portion
21, 22, 23 block row
21B, 22B, 23B hexagonal block
24 circumferential thin groove
25, 26, 27 lug groove
28 sipe 30 second land portion
30B hexagonal block
31, 32 sipe
40 shoulder land portion
40B large block
41 lug groove
42 narrow groove
70 rectangular block
CL tire equatorial surface

BEST MODES FOR CARRYING OUT THE INVENTION

An embodiment of a tire of the present invention will be described below by referring to the attached drawings.

The tire of this embodiment is a tire for a heavy load such as a truck and a bus and for a passenger car, for example, and a pneumatic tire for a heavy load is exemplified below, but any other tires such as a tire in which a gas other than air is filled may be exemplified. Moreover, this tire has a known tire structure provided with a bead core arranged in a pair of bead portions, a carcass extending between them, a belt arranged on an outer periphery side of the carcass at the tread portion, and a tread rubber on which a predetermined tread pattern is formed.

Figure 1:
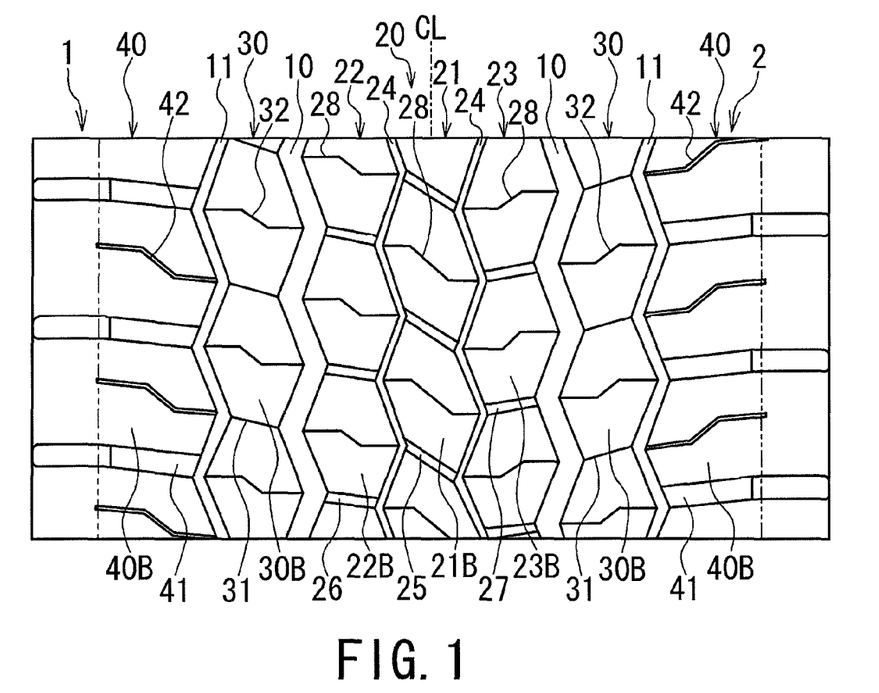
FIG. 1 is a plan view illustrating a tread pattern of a tire of this embodiment in an extended manner.

FIG. 1 is a plan view illustrating a tread pattern of the tire of this embodiment in an extended manner and schematically illustrates a part of a tire circumferential direction (vertical direction in the figure).

A tire 1 includes, as illustrated in the figure, at a tread portion 2, a plurality of circumferential main grooves 10 and 11 extending in the tire circumferential direction in a zig-zag manner and a plurality of land portions 20, 30, and 40 defined by the circumferential main grooves 10 and 11 and extending in the tire circumferential direction.

The circumferential main grooves 10 and 11 include two center-side circumferential main grooves 10 arranged sandwiching a tire equatorial surface CL and two outer-side circumferential main grooves 11, each being arranged between the main groove 10 and a tread end on the outer side in the tire width direction (outer end in the tire width direction). These circumferential main grooves 10 and 11 are alternately bent in the both directions in the tire width direction (lateral direction in the figure) at a predetermined pitch in a zig-zag manner and are formed having the same (or substantially the same) zig-zag pitch and depth in the tire radial direction. However, a groove width (the width in the direction orthogonal to the direction in which each groove extends) of the outer-side circumferential main groove 11 (in a range of 3 to 6 mm, here) is formed smaller than the groove width of the center-side circumferential main groove 10 (in a range of 8 to 10 mm, here).

The center-side circumferential main groove 10 and the outer-side circumferential main groove 11 adjacent to each other in the tire width direction are arranged relatively close to each other, but the center-side circumferential main grooves 10 are arranged with a wider interval between them in the tire width direction. The circumferential main grooves 10 and 11 are arranged with their zig-zag phases shifted in the tire circumferential direction in a predetermined pattern at each arranged position and form opposing wall surfaces of land portions 20, 30, and 40 in the zig-zag manner across the tread portion 2 in the tire width direction.

The plurality of land portions 20, 30, and 40 includes a center land portion 20 located on the tire equatorial surface CL defined by the two center-side circumferential main grooves 10, two second land portions (intermediate land portions) 30 located in intermediate regions defined by the circumferential main grooves 10 and 11, and two shoulder land portions 40 located on the outermost sides (shoulder portion sides) in the tire width direction. Among them, each of the center land portion 20 and the second land portions 30 is defined on the both sides in the tire width direction by the circumferential main grooves 10 and 11, while a shoulder land portion 40 is defined only on one side by the outer-side circumferential main groove 11 and arranged between that and the tread end. The width of each of the land portions 20, 30, and 40 in the tire width direction is formed as a width corresponding to the arranged positions of the circumferential main grooves 10 and 11, that is, the center land portion 20 is the widest land portion and the width becomes smaller in the order of the shoulder land portions 40 and the second land portions 30.

Moreover, in this embodiment, in the center land portion 20 at the center part in the tire width direction and the second land portions 30 located on the both sides in the tire width direction sandwiching the center land portion 20 excluding the outermost shoulder land portions 40, a plurality of blocks 21B, 22B, 23B, and 30B having the similar mode is provided. Each of these blocks 21B, 22B, 23B, and 30B is formed having a polygonal shape such as a hexagonal shape or more in planar view, gradually expanding to the both sides in the tire width direction from the both end portions in the tire circumferential direction toward the center, and the wall surfaces on the both sides in the tire width direction protruding to the outer side and is aligned along the tire circumferential direction at a predetermined pitch. Here, each of these blocks 21B, 22B, 23B, and 30B is formed having a hexagonally-shaped block in planar view (hereinafter referred to as a hexagonal block), in which two faces on the same side in the tire width direction are inclined in a direction opposite to the tire circumferential direction, and the width in the tire width direction gradually expands from the both end portions in the tire circumferential direction to the center part. Moreover, each of the hexagonal blocks 21B, 22B, 23B, and 30B is formed having substantially the same block width in the tire width direction (width in the tire width direction between pointed ends in the tire width direction) and a diagonally inclined shape and arranged while being shifted from each other in the tire circumferential direction.

Subsequently configurations of the land portions 20, 30, and 40 will be described in detail in order.

The tire 1 has, in the center land portion 20, a plurality of circumferential thin grooves 24 extending in a zig-zag manner in the tire circumferential direction similarly to the center-side circumferential main groove 10, a plurality of lug grooves 25, 26, and 27 extending inclined in the tire width direction, and a sipe 28 provided in each of the hexagonal blocks 21B, 22B, and 23B. The circumferential thin groove 24 is a thin groove defining the center land portion 20 in the tire width direction and divides it into a plurality of rows (block rows) closely gathered in the center part in the tire width direction. The thin groove is formed having a width smaller than that of the circumferential main grooves 10 and 11 and is arranged while shifting the zig-zag phase alternately in the tire circumferential direction. In this tire 1, the circumferential thin groove 24 is formed having a groove width within a range of 2 to 4 mm and arranged one each on the both sides, totaling two, sandwiching the tire equatorial surface CL with a shift of a half pitch from each other and defines three rows of the center land portion 20.

The lug grooves 25, 26, and 27 are arranged in plural with predetermined intervals in the tire circumferential direction between the two circumferential thin grooves 24 and between each of the circumferential thin grooves 24 and the center-side circumferential main groove 10, and the both ends thereof are opened to the circumferential thin grooves 24 and the center-side circumferential main groove 10 so as to separate the center land portion 20. Moreover, each of the lug grooves 25, 26, and 27 is arranged so as to connect closely located bent parts of each of the grooves 24 and 10 and opened at each bent part and defines in the circumferential direction each row of the center land portion 20 defined by the circumferential thin grooves 24 in the tire width direction. Moreover, the lug grooves 25, 26, and 27 are inclined by a predetermined angle with respect to the tire width direction and each of the rows defined by the circumferential thin grooves 24 is formed in directions different from each other.

The center land portion 20 is defined into a plurality of hexagonal blocks 21B, 22B, and 23B on the whole by the circumferential thin grooves 24 and the lug grooves 25, 26, and 27, they are aligned in the tire circumferential direction, sandwiching the lug grooves 25, 26, and 27, and also arranged closely to each other in the tire width direction, sandwiching the circumferential thin grooves 24. As a result, a block row 21 at the center part located on the tire equatorial surface CL in which the hexagonal blocks 21B, 22B, and 23B are arranged in plural and block rows 22 and 23 on the right and left sides thereof sandwiching the circumferential thin grooves 24 are provided in the center land portion 20. At that time, in the block rows 21, 22, and 23, the hexagonal blocks 21B, 22B, and 23B close to each other in the tire width direction are arranged while being shifted by a predetermined distance (a half of the block alignment pitch, here) in the tire circumferential direction with respect to the block center in the tire circumferential direction.

As described above, the center land portion 20 includes the plurality of hexagonal blocks 21B, 22B, and 23B arranged in plural closely to each other in the tire width direction and defined by the lug grooves 25, 26, and 27 in the tire circumferential direction. Moreover, in the center land portion 20, the plurality of block rows 21, 22, and 23 close to each other in the tire width direction, sandwiching the circumferential thin grooves 24, is provided, and in each of the block rows 21, 22, and 23, the same hexagonal blocks 21B, 22B, and 23B and the lug grooves 25, 26, and 27 are arranged, respectively.

Here, each of the lug grooves 25, 26, and 27 is formed having a groove width substantially the same as that of the circumferential thin groove 24 (2 to 5 mm, here) and a depth of 80 to 90% of the depth of each of the circumferential main grooves 10 and 11. Moreover, the lug grooves 26 and 27 in the left and right block rows 22 and 23 are formed at an angle of 5 to 40° with respect to the tire width direction and inclined in directions opposite to each other in the tire width direction. On the other hand, the lug groove 25 in the block row 21 in the center part is formed by an angle of 10 to 40° with respect to the tire width direction with larger inclination than the other lug grooves 26 and 27. As a result, the hexagonal block 21B in the block row 21 in the center part protrudes in the tire circumferential direction larger than the other hexagonal blocks 22B and 23B, and the projected end portion (corner portion) forms an acute angle. In addition, at the center part in the tire circumferential direction of each of the hexagonal blocks 21B, 22B, and 23B, a sipe 28 is arranged so as to connect both projected ends projecting in the tire width direction. Each sipe 28 is formed having a depth of 80 to 90% of the depth of each of the circumferential main grooves 10 and 11 and traverses each of the hexagonal blocks 21B, 22B, and 23B in the tire width direction by bending once or more and divides each of them in the tire circumferential direction.

On the other hand, the tire 1 has a sipe (hereinafter referred to as a first sipe 31) which becomes a boundary of the hexagonal block 30B and a sipe (hereinafter referred to as a second sipe 32) provided in each of the hexagonal blocks 30B at the second land portion 30. The first sipe 31 and the second sipe 32 are arranged alternately in plural in the tire circumferential direction at the same pitch as the zig-zag pitch thereof in compliance with the phases of the circumferential main grooves 10 and 11 on the both sides. Moreover, the first sipes 31 are arranged across the second land portion 30 in the tire width direction so as to connect the close bent portions of the adjacent circumferential main grooves 10 and 11 to each other and the both ends thereof are opened in each of the bent portions and divides the second land portion 30 in the tire circumferential direction. One block row including a plurality of hexagonal blocks 30B aligned in the tire circumferential direction is formed by this sipe 31 and the circumferential main grooves 10 and 11 in the second land portion 30.

In addition, the first sipes 31 are formed at a predetermined angle within a range of 5 to 40° with respect to the tire width direction and inclined in directions opposite to each other in the tire width direction on the second land portions 30 on the both sides. On the other hand, the second sipes 32 are arranged at the center part in the tire circumferential direction of each hexagonal block 30B so as to connect projected end portions (corner portions) projecting to the both sides in the tire width direction. The second sipe 32 bends once or more in the hexagonal block 30B and traverses it in the tire width direction, with the both ends thereof opened in the circumferential main grooves 10 and 11, and divides the hexagonal block 30B in the tire circumferential direction. The first sipe 31 and the second sipe 32 are formed having a depth of 80 to 90% of the depth of each of the circumferential main grooves 10 and 11.

The first sipe 31 is a thin cut-in formed in the second land portion 30, and at least a part of the opposing wall surfaces are brought into contact and closed in a ground-contacting surface during tire rolling motion so as to bring the hexagonal blocks 30B on the both sides into contact with each other. Thus, the second land portion 30 is configured such that the hexagonal blocks 30B are sequentially brought into contact with each other with the tire rolling motion and continue in the tire circumferential direction in the ground-contacting surface. As described above, the second land portion 30 is different from the center land portion 20 defined by the lug grooves 25, 26, and 27 but the plurality of hexagonal blocks 30B continues in the tire circumferential direction, sandwiching the first sipe 31 and they form a continuous rib shape at least in the ground-contacting surface.

The tire 1 has at least 5 block rows formed of the hexagonal blocks 21B, 22B, 23B, and 30B including this pair of second land portions 30 and the center land portion 20 at the tread portion 2, and they are arranged sequentially in the tire width direction while being shifted in the tire circumferential direction. At that time, the hexagonal blocks 21B, 22B, 23B, and 30B adjacent to each other while sandwiching each of the grooves 10 and 24 are arranged while being shifted in the tire circumferential direction by a half of the block alignment pitch on the basis of the block center in the tire circumferential direction.

Moreover, the tire 1 has a plurality of lug grooves 41 and narrow grooves 42 extending linearly, or with inclination or bending, in the tire width direction in the shoulder land portion 40 on the outermost side in the tire width direction. The lug grooves 41 and the narrow grooves 42 are arranged alternately in the tire circumferential direction at the same pitch as the zig-zag pitch of the outer-side circumferential main groove 11 defining the shoulder land portion 40 and their inner-side end portions in the tire width direction are opened to the outer-side circumferential main grooves 11. Moreover, the lug groove 41 extends with inclination in the tire width direction from the bent portion projecting to the outer side in the tire width direction of the outer-side circumferential main groove 11, traverses the shoulder land portion 40 and defines the plurality of blocks 40B aligned in the tire circumferential direction at the shoulder land portion 40.

The block 40B at the shoulder land portion 40 is defined as a block (large blocks) having an area of a tire tread larger than each of the hexagonal blocks 21B, 22B, 23B, and 30B at the other land portions 20 and 30, and arranged while being shifted in the tire circumferential direction with respect to the adjacent hexagonal block 30B. Moreover, the narrow groove 42 is formed at the center part in the tire circumferential direction of each large block 40B, bending once or more from the projected end portion projecting to the inner side in the tire circumferential direction of the large block 40B outward in the tire width direction. As described above, the shoulder land portion 40 is formed of a plurality of the large blocks 40B aligned in the tire circumferential direction, sandwiching the lug groove 41, without having a sipe.

Here, the wear amount of the block is known to have a correlation with wear energy which is the product of a slip amount generated between the block and the road surface and a shearing force (product of a ground-contacting pressure and a friction factor μ) acting from the road surface on the block as described in Patent Document 1. Moreover, the shearing force is usually larger on a kick-out end than on a step-in end of the block. On the other hand, the slip of the block includes slip caused by belt bending deformation (belt tread relative displacement) and slip caused by recovery from compression deformation of the block (crushing) (hereinafter referred to as block deformation recovery), and the former slip occurs in the tire rotating direction and the latter in the outward in the perpendicular direction of the block wall surface. In the rectangular block having a rectangle shape in planar view, it is known from analysis of the slip under the condition assuming commercial running that slip concentrates on the kick-out end on the outer side of the block where the ground-contacting pressure rises and the shearing force also increases in the vicinity thereof. Thus, wear energy rises on the kick-out end and the wear amount increases. In addition, if a thickness (gauge) of the tread rubber is increased for improvement of cutting resistance as in a tire for heavy load, the slip in the tire rotating direction becomes large under the influence of the belt bending deformation at the kick-out, and the wear amount at the kick-out end also becomes large.

As described above, the wear amount of each part of the block is correlated with slip, and it is only necessary to reduce uneven slip in order to reduce partial wear in a block, and reduction of slip in the tire rotating direction on the kick-out end is effective for a tire for heavy load. At that time, wear energy can be unified among each part in the block and the heel-and-toe wear can be suppressed by regulating slip on the kick-out end where the shearing force is large and the wear amount tends to be large. In this embodiment, the heel-and-toe wear is suppressed by forming the hexagonal blocks 21B, 22B, 23B, and 30B so as to gradually expand to the both ends in the tire width direction from the both end portions in the tire circumferential direction toward the center. The slip and wear will be described by using the one hexagonal block 23B as an example, but the same applies to the other hexagonal blocks 21B, 22B, and 30B.

Figure 2:
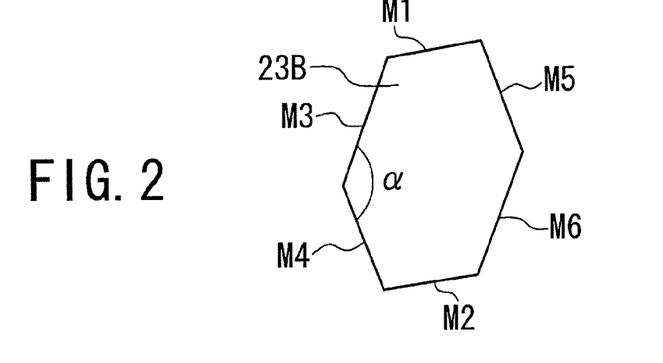
FIG. 2 is a plan view illustrating a hexagonal block of this embodiment.
Figure 3:
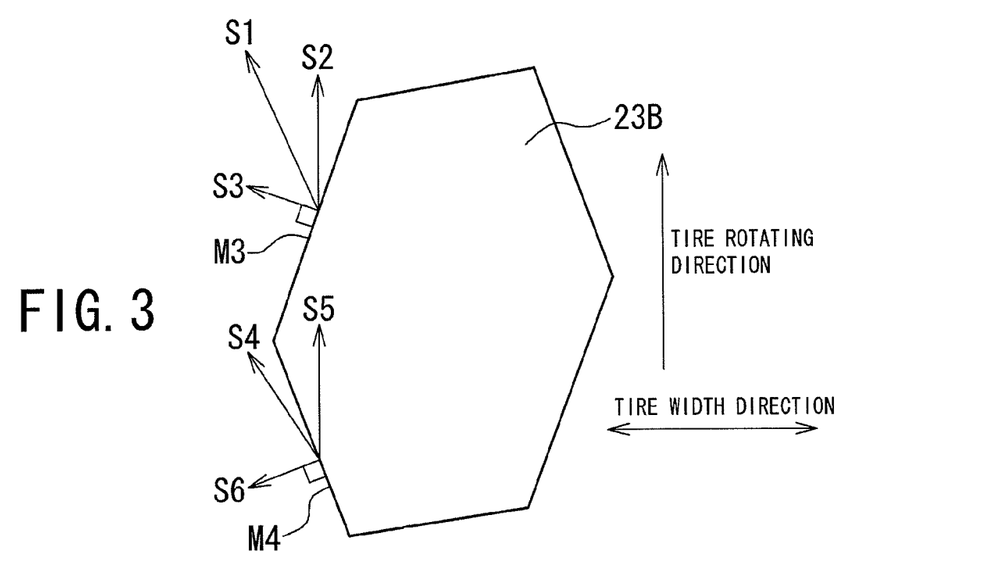
FIG. 3 is a diagram for explaining slip of the hexagonal block in FIG. 2.
Figure 4:
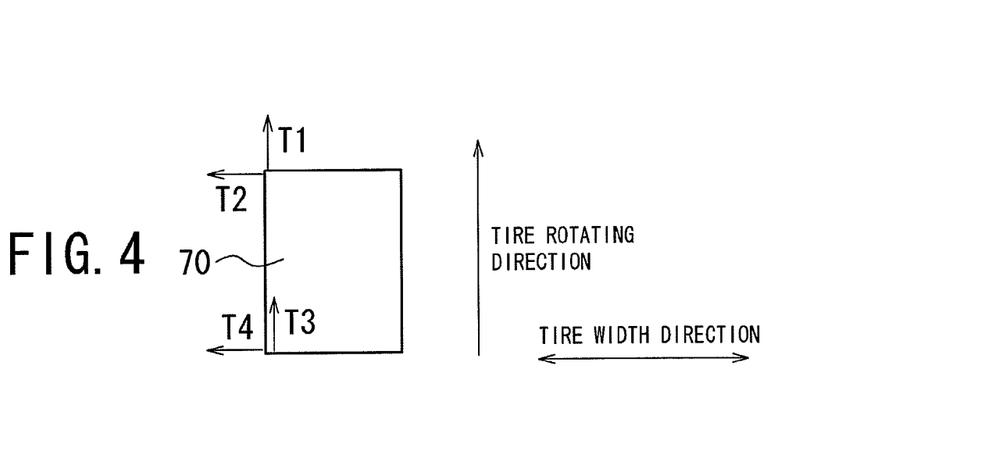
FIG. 4 is a plan view illustrating a rectangular block having a rectangular shape in planar view.

FIG. 2 is a plan view illustrating the hexagonal block 23B, and FIG. 3 is a diagram for explaining slip of the hexagonal block 23B in FIG. 2. FIG. 4 is a plan view illustrating a rectangular block having a rectangular shape in planar view described above.

The hexagonal block 23B (See FIG. 2) has a front face M1 on the front side in the tire rotating direction, a rear face M2 on the rear side, and side faces M3 to M6 between them, and the front face M1 side is the step-in end contacting the ground first during tire rotation and the rear face M2 side is the kick-out end contacting the ground last. Moreover, the side faces M3 and M4 on one side and the side faces M5 and M6 on the other side in the tire width direction are inclined in opposite directions to each other with respect to the tire rotating direction (tire circumferential direction).

Slip S1 on the side face M3 (See FIG. 3) on the step-in end side is the vector sum of slip S2 in the tire rotating direction caused by belt bending deformation and slip S3 outward in the perpendicular direction of the side face M3 caused by block deformation recovery. Similarly, slip S4 of the side face M4 on the kick-out end side is the vector sum of slip S5 in the tire rotating direction caused by the belt bending deformation and slip S6 outward in the perpendicular direction of the side face M4 caused by the block deformation recovery.

When the slip of this hexagonal block 23B is compared with slip of a rectangular block 70 (See FIG. 4), regarding the slip S1 of the side face M3, the slip S3 which is a component thereof has the same tire rotating direction component as the slip S2 in the tire rotating direction. On the contrary, regarding slip on the step-in end of the rectangular block 70, directions of two types of slips T1 and T2 are orthogonal to each other, and thus, the slip of the side face M3 of the hexagonal block 23B becomes larger. On the other hand, regarding the slip S4 of the side face M4, slip S6 which is a component thereof has a tire rotating direction component opposite to slip S5 in the tire rotating direction. On the contrary, regarding slip on the kick-out end of the rectangular block 70, the directions of two types of slips T3 and T4 are orthogonal to each other, and thus, the slip of the side face M4 of the hexagonal block 23B becomes smaller. Moreover, the side faces M5 and M6 (See FIG. 2) on the other side in the tire width direction of the hexagonal block 23B also have the relationship similar to that of the side faces M3 and M4 on the one side.

As a result, regarding the hexagonal block 23B, the slip is relatively larger on the step-in end side where the shearing force is small and relatively smaller on the kick-out end side where the shearing force is large as compared with the rectangular block 70, and thus, unevenness of the slip is reduced on the whole. As a result, the wear energy which is the product of the slip amount and the shearing force becomes smaller in the difference between the step-in end side and the kick-out end side in the hexagonal block 23B, and evenness in the tire circumferential direction improves. Particularly, on the side face M4 on the kick-out end side (and the side face M6, too), the slip S5 in the tire rotating direction decreases in the component in the opposite tire rotating direction of the slip S6, and the slip and the wear amount on the kick-out end decreases even in a tire for a heavy load with thick tread rubber. Thus, the wear on the kick-out end side of the hexagonal block 23B is reduced, the heel-and-toe wear is suppressed, and partial wear occurring in each hexagonal block 23B is reduced.

Moreover, in the rectangular block 70 having the side faces in parallel with the tire rotating direction, in the event of slip to the outside of the block under the influence of a slip angle, slip caused by recovery in the vicinity of the side face deformed by the slip and slip caused by block deformation recovery occur in the same direction on the edge on the side face side. As a result, the wear amount of the rectangular block 70 becomes large on the outer side of the block where both the slips overlap and occur in the same direction, and the partial wear becomes larger. On the other hand, in the hexagonal block 23B, since the side faces M3 to M6 are inclined with respect to the tire rotating direction, the directions of the two slips described above on the outer side of the block become different from each other. Therefore, the slip on the edge on the side faces M3 to M6 sides becomes smaller than that on the rectangular block 70, and the wear amount and partial wear on the outer side of the block are effectively reduced.

In this embodiment, the center land portion 20 and the both second land portions 30 are formed of the plurality of hexagonal blocks 21B, 22B, 23B, and 30B described above, and they are defined in the tire circumferential direction by the lug grooves 25, 26, and 27 in the center land portion 20, while the hexagonal blocks 30B are provided sandwiching the first sipe 31 on the second land portion 30. Thus, occurrence of partial wear in the tread portion 2 including the land portions 20 and 30 can be suppressed by reduction of the heel-and-toe wear and the like of the hexagonal blocks 21B, 22B, 23B, and 30B. At the same time, the hexagonal blocks 21B, 22B, and 30B have many edge portions including the edges on the side of the lug grooves 25, 26, and 27 and the first sipe 31, a high edge effect can be obtained from them, and wet performances (traction performance and braking performance on a wet road surface, for example) of the tire 1 can be improved.

In addition, the second land portion 30 is formed into a rib shape where the hexagonal blocks 30B are continuing in the tire circumferential direction, sandwiching the first sipe 31 and thus, the deformed hexagonal blocks 30B are brought into contact with each other in the ground-contacting surface during the tire rolling motion, and an effect of supporting each other is exerted. Therefore, deformation or motion such as falling down of the hexagonal block 30B and the like is suppressed while the edge component is increased, whereby block rigidity can be improved, slip of each part (particularly on the kick-out end) and the acting shearing force can be reduced, and occurrence of partial wear can be further suppressed.

On the other hand, the lug grooves 25, 26, and 27 having higher effect of improving the wet performance than the sipe are arranged in the center land portion 20 at the center part in the tire width direction, and thus, the wet performance (particularly, the traction performance) of the tire 1 can be improved. At that time, since heel-and-toe wear occurs more hardly in the center land portion 20 than in the land portions 30 and 40 at the other positions, even if the block rigidity is relatively low due to the lug grooves 25, 26, and 27, occurrence of partial wear can be sufficiently suppressed. Moreover, since the hexagonal blocks 21B, 22B, and 23B are arranged in plural and closely to each other in the tire width direction, sandwiching the circumferential thin grooves 24, in the center land portion 20, the edge components can be increased in accordance with the number of arrangements. At the same time, since the adjacent hexagonal blocks 21B, 22B, and 23B are deformed and brought into contact with each other, and the effect of supporting each other is exerted during the tire rolling motion, deformation or motion such as falling down of them and the like can be suppressed, and the block rigidity can be improved. As a result, lowered block rigidity by the lug grooves 25, 26, and 27 is compensated for, slip of the hexagonal blocks 21B, 22B, and 23B and the like is reduced, and occurrence of the partial wear can be suppressed similarly to the second land portion 30 described above, whereby balance of the wear resistance of the tread portion 2 can be improved.

Therefore, according to this embodiment, both the wet performance and the partial wear resistance of the tire 1 including the plurality of land portions 20, 30, and 40 on the tread portion 2 can be improved. Moreover, since the step-in ends of the hexagonal blocks 21B, 22B, 23B, and 30B are formed having the shape gradually expanding toward the center in the tire circumferential direction, an impact when they step into the ground-contacting surface (block step-in) becomes small, and a noise generated during running of the tire 1 can be also reduced. Moreover, since the sipes 28 and 32 are provided in each of the hexagonal blocks 21B, 22B, 23B, and 30B in this tire 1, the edge effect is exerted also on the both sides of the sipes 28 and 32, and the wet performance of the tire 1 is further improved. At the same time, since the shoulder land portion 40 is formed of the large block 40B having a relatively large area on the tire tread surface and not having a sipe, the block rigidity can be improved also in the shoulder land portion 40, and occurrence of partial wear such as uneven wear can be suppressed.

Here, a plurality of the circumferential thin grooves 24 are preferably formed extending in the zig-zag manner while shifting the phases thereof from each other in the tire circumferential direction in the center land portion 20 so that the land portion is defined in the tire width direction and the adjacent hexagonal blocks 21B, 22B, and 23B are formed while being shifted in the tire circumferential direction in the center land portion 20. By configuring as above, a pattern noise generated during the tire rolling motion can be dispersed, and sequentially generated noise can be reduced, and thus, a noise during running of the tire 1 can be further reduced. In addition, by forming the lug grooves 25, 26, and 27 in different directions for each of the block rows 21, 22, and 23 defined by the circumferential thin grooves 24, the effect of dispersing the pattern noise is further improved, and the generated noise can be further reduced.

Moreover, if each of the lug grooves 25, 26, and 27 and the first sipe 31 of the second land portion 30 are formed in parallel with the tire width direction, appearance affected by the heel-and-toe wear becomes poorer, and thus, they are preferably formed with inclination at a predetermined angle with respect to the tire width direction. At that time, if the inclination angle of each of the lug grooves 25, 26, and 27 and the first sipe 31 with respect to the tire width direction is less than 5°, there is a concern that the impact at the block step-in may not be reduced enough and the noise may become larger. On the contrary, if the inclination angle exceeds 40°, the rigidity of the block end portion is lowered, the heel-and-toe wear becomes worse or a block might be chipped. Therefore, the inclination angle is more preferably set in a range of 5 to 40°.

Moreover, if the groove width of the circumferential thin groove 24 is smaller than 2 mm, drainage performance lowers, while if it is larger than 4 mm, the adjacent hexagonal blocks 21B, 22B, and 23B cannot be easily brought into contact with each other, and thus, it is preferably set to 2 to 4 mm. If the groove width of each of the lug grooves 25, 26, and 27 is smaller than 2 mm, drainage performance lowers, while if it is larger than 5 mm, a ground-contacting area decreases and the ground-contacting pressure might become higher, and thus, it is preferably set to 2 to 5 mm. If the groove width of the center-side circumferential main groove 10 is smaller than 8 mm, drainage performance can no longer be ensured easily, while if it is larger than 10 mm, the ground-contacting area decreases and the ground-contacting pressure might rise, and thus, it is preferably set to 8 to 10 mm. If the depth of each of the lug grooves 25, 26, and 27 and the sipes 28, 31, and 32 is shallower than 80% of the main groove depth of each of the circumferential main grooves 10 and 11, the drainage performance is affected, while if it is deeper than 90%, the block rigidity might lower, and thus, it is preferably set to the depth of 80 to 90% of the main groove depth. If the angle between the continuous side faces of each of the hexagonal blocks 21B, 22B, 23B, and 30B (α in FIG. 2) is less than 120°, the rigidity of the area between the side faces lowers and the deformation increases, and the effect of making the slip even deteriorates. On the other hand, if the angle exceeds 150°, the direction of each slip becomes close to the tire rotating direction, and the effect of making the slip even also lowers, and thus, this angle α is more preferably set to the angle of 120 to 150°.

The circumferential main grooves 10 and 11 may be formed having a shape different from the above and extending in the zig-zag state in the tire circumferential direction while being displaced in the tire width direction such that the linear portion is formed into a curved shape or a portion extending in the tire circumferential direction is sandwiched by the bent portions and bent in addition to the linear extension with inclination alternately in opposite directions with respect to the tire circumferential direction. Moreover, in this embodiment, the hexagonal blocks 21B, 22B, 23B, and 30B are exemplified in explanation, but each of the blocks 21B, 22B, 23B, and 30B may be formed having a polygonal shape of a heptagon or more in planar view or such that a part of or the whole of the wall surface is formed having the curved shape. As described above, the shape of each of the blocks 21B, 22B, 23B, and 30B is not limited to a hexagonal shape in planar view but may be formed having a shape by which the similar effect can be obtained, that is, the shape gradually expanding to the both sides in the tire width direction from the both end portion in the tire circumferential direction to the center.

(Tire Test)

In order to check the effect of the present invention, the tire 1 in the embodiment provided with the tread pattern described above (See FIG. 1) (hereinafter referred to as a product), four comparative example tires, each having different configuration of a part of the tread pattern (hereinafter referred to as comparative products 1 to 4), and a prior-art tire (hereinafter referred to as a prior-art product) were made on a trial basis. In the prior-art product, the rectangular block 70 (See FIG. 4) was defined by the circumferential main groove extending linearly in the tire circumferential direction and the lug groove extending linearly in the tire width direction, and seven block rows, each formed of the rectangular blocks 70 aligned in the tire circumferential direction were formed in the tire width direction. By using each of these tires, the noise and the block wear were measured, and the results were compared with each other.

The product, the comparative products 1 to 4, and the prior-art product are all radial ply tires for truck and bus having the tire size of 315/80R22.5 prescribed by JATMA YEAR BOOK (2009, Japan Automobile Tire Manufacturers Association standards). The test conditions are as follows:

Rim: 9.00
Internal pressure: 900 kPa
Vehicle: 2-D tractor
Load of single tire: 3650 kg (dual tires)
Tire attachment position: drive shaft
Running distance at the final evaluation: 50000 km
Running road: general road and expressway
Noise test condition: conducted under the condition based on the European noise regulation by using a vehicle (2-D tractor)

Table 1 indicates details of the tread pattern of each tire, noise (dB) measured during running, a ratio of a wear amount X1 of the shoulder land portion 40 to a wear amount X2 of the center land portion 20 (X1/X2) (wear resistance balance). Moreover, Table 1 also indicates a difference in the wear amounts between the step-in end and the kick-out end (H/T step amount) measured at the block row 21 and the left and right block rows 22 and 23 at the center part in the center land portion 20.

TABLE 1

|  | CENTER LAND PORTION PHASE SHIFTED LUG GROOVE ANGLE | CENTER LAND PORTION BLOCK CLOSELY ARRANGED | CENTER LAND PORTION COMPONENT | SECOND LAND PORTION COMPONENT |
|---|---|---|---|---|
| PRODUCT | 35° | YES | SIPE + LUG GROOVE | SIPE + SIPE |
| COMPARATIVE PRODUCT1 | 35° | NO | SIPE + LUG GROOVE | SIPE + SIPE |
| COMPARATIVE PRODUCT2 | 35° | YES | SIPE + LUG GROOVE | SIPE + LUG GROOVE |
| COMPARATIVE PRODUCT3 | 35° | YES | LUG GROOVE + LUG GROOVE | LUG GROOVE + LUG GROOVE |
| COMPARATIVE PRODUCT4 | 0° | YES | SIPE + LUG GROOVE | SIPE + SIPE |
| PRIOR-ART PRODUCT | 0° | NO | LUG GROOVE + LUG GROOVE | LUG GROOVE + LUG GROOVE |

|  | NOISE (dB) | WEAR RESISTANCE BALANCE | H/T STEP AMOUNT (mm) | |
|---|---|---|---|---|
|  |  |  | CENTER PART | RIGHT AND LEFT |
| PRODUCT | 73 dB | 99% | 1.5 mm | 1.3 mm |
| COMPARATIVE PRODUCT1 | 73.2 dB | 89% | 1.5 mm | 1.4 mm |
| COMPARATIVE PRODUCT2 | 73 dB | 97% | 1.6 mm | 2.2 mm |
| COMPARATIVE PRODUCT3 | 73.3 dB | 99% | 2.9 mm | 3.2 mm |
| COMPARATIVE PRODUCT4 | 75.8 dB | 98% | 1.6 mm | 1.4 mm |
| PRIOR-ART PRODUCT | 76.5 dB | 86% | 2.8 mm | 3.0 mm |

As indicated in Table 1, in the product, the phase of the circumferential thin groove 24 was shifted in the center land portion 20, and the lug groove 25 in the block row 21 at the center part was inclined by 35° with respect to the tire width direction. Moreover, in the product, the hexagonal blocks 21B, 22B, and 23B in the center land portion 20 are brought close to each other (closely-packed block) in the tire width direction, and the sipe 28 and the lug grooves 25, 26, and 27 were provided in the center land portion 20, and the sipes 31 and 32 were provided in the second land portion 30. On the other hand, in the comparative product 1, the blocks were not closely paced in the center land portion 20 and in the comparative product 2, the first sipe 31 of the second land portion 30 was replaced by a lug groove. In the comparative product 3, the sipe 28 of the center land portion 20 was replaced by the lug groove and the both sipes 31 and 32 of the second land portion 30 were replaced by the lug grooves. In the comparative product 4, the lug groove 25 in the center land portion 20 is formed at an angle of 0° with respect to the tire width direction without inclination. The prior-art product was formed having each configuration different from that of the product as described above.

As the result of the test, the noise was 73 to 73.3 dB in the comparative products 1 to 3, 75.8 dB in the comparative product 4, 73 dB in the product in contrast with 76.5 dB in the prior-art product, and the noise was drastically reduced in the comparative products 1 to 3 and the product. The wear resistance balance was 89% in the comparative product 1, 97 to 99% in the comparative products 2 to 4, and the 99% in the product in contrast with 86% in the prior-art product, and the wear resistance balance was drastically improved in the comparative products 2 to 4 and the product. The H/T step amount was 2.8 mm and 3.0 mm in the prior-art product, 2.9 mm and 3.2 mm in the comparative product 3, 2.2 mm in the left and right block rows 22 and 23 in the comparative product 2, and the H/T step amount was relatively large. On the contrary, the H/T step amount was 1.5 mm and 1.3 mm in the product (the comparative products 1 and 4 are substantially the same) and was drastically smaller. As a result, it was found that the noise, the wear resistance balance, and the H/T step amount were all improved in the product.

From the above results, it was proved that the partial wear resistance of the tire 1 including the plurality of land portions 20, 30, and 40 in tread portion 2 is improved, and the noise generated during running of the tire 1 can be reduced by the present invention.

The invention claimed is:

1. A tire comprising, at a tread portion, a plurality of circumferential main grooves extending in a tire circumferential direction in a zig-zag manner; and a plurality of land portions defined by the circumferential main grooves, wherein
the plurality of land portions includes a center land portion at the center part in a tire width direction in which a plurality of blocks gradually expanding to the both sides in the tire width direction from the both end portions in the tire circumferential direction toward the center and a second land portion on the both sides in the tire width direction of the center land portion;
the center land portion has a plurality of the blocks arranged closely to each other in the tire width direction and defined by lug grooves in the tire circumferential direction; and
the second land portion is formed into a rib shape without lug grooves where a plurality of blocks are continuing in the tire circumferential direction while sandwiching a sipe,
a plurality of circumferential thin grooves extending in a zig-zag manner while being phase-shifted from each other in the tire circumferential direction and defining the center land portion in the tire width direction, and
wherein the circumferential thin grooves have a smaller width in the tire width direction than the circumferential main grooves,
wherein all of the lug grooves in the center land portion are formed inclined with respect to the tire width direction.

2. The tire according to claim 1, wherein
the lug grooves in the center land portion are each formed in different directions from each other for each row defined in the tire width direction by the circumferential thin groove.

3. The tire according to claim 1, wherein
the sipe in the second land portion are formed inclined with respect to the tire width direction.

4. The tire according to claim 1, wherein
each block of the center land portion and the second land portion has a sipe.

5. The tire according to claim 1, wherein
the plurality of land portions includes a shoulder land portion located on the outermost side in the tire width direction; and
the shoulder land portion has a plurality of large blocks each having a tire tread surface larger than the block of the other land portions and not having a sipe.

6. The tire according to claim 1, wherein
a groove width of the circumferential thin groove is 2 to 4 mm.

7. The tire according to claim 1, wherein
the circumferential main grooves are located closer to the second land portion than the circumferential thin grooves.

* * * * *